United States Patent [19]

Jessee

[11] 3,710,229
[45] Jan. 9, 1973

[54] INTEGRATOR CONTROLLED INVERTER

[75] Inventor: Ralph D. Jessee, Lima, Ohio

[73] Assignee: Westinghouse Electric Corporation, Pittsburgh, Pa.

[22] Filed: June 11, 1971

[21] Appl. No.: 152,115

[52] U.S. Cl. .................................321/9 A, 321/45 R
[51] Int. Cl. ............................................H02m 1/12
[58] Field of Search ......................321/9 A, 18, 45 R

[56] References Cited

UNITED STATES PATENTS

| | | | |
|---|---|---|---|
| 3,614,590 | 10/1971 | Kernick | 321/9 A |
| 3,214,672 | 10/1965 | Watkins | 321/9 A |
| 3,324,376 | 6/1967 | Hunt | 321/9 A |
| 3,416,062 | 12/1968 | Bernhard et al. | 321/27 MS |
| 3,558,915 | 1/1971 | Wood | 321/45 R |
| 3,566,148 | 2/1971 | Wood | 321/45 R |

*Primary Examiner*—William M. Shoop, Jr.
*Attorney*—F. H. Henson et al.

[57] ABSTRACT

An inverter circuit comprising a first and second pair of conduction controlled switching elements for generating a pulsed wave output approximating a desired AC output waveform in response to drive signals, in which an AC reference waveform is utilized to control the switching of one of the switching elements in each of the pairs of switching elements, while the second switching element in each of the said pairs is controlled as a function of deviation from high and low reference limits of a signal corresponding to the integral of the difference between the output voltage of the inverter circuit and the AC reference waveform.

5 Claims, 11 Drawing Figures

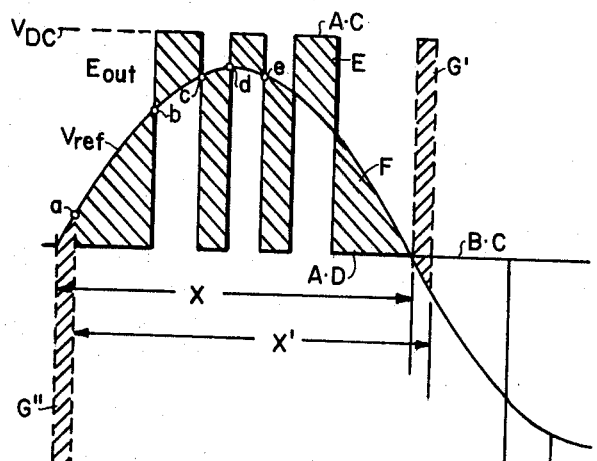
FIG.5A
| SIGNAL | TURNS ON |
|--------|----------|
| A | Q1 |
| B | Q2 |
| C | Q4 |
| D | Q3 |
FIG.5B
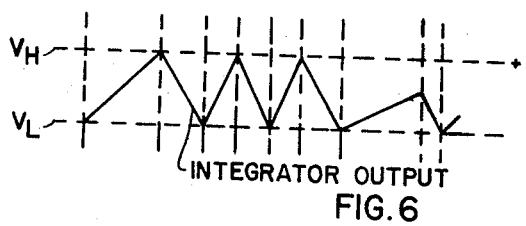
INTEGRATOR OUTPUT
FIG.6
| OUTPUT VOLTAGE LEVELS | |
|---|---|
| Q1 + Q4 | = + OUTPUT |
| Q2 + Q3 | = − OUTPUT |
| Q1 + Q3 | = 0 OUTPUT |
| Q2 + Q4 | = 0 OUTPUT |
FIG.5C
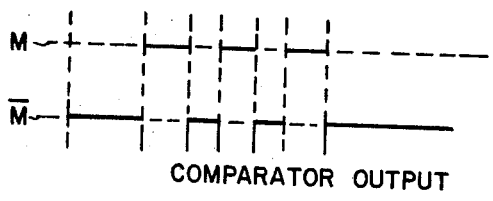
COMPARATOR OUTPUT
FIG.7
| X = 1 WHEN $V_{ref} > 0$ |
|---|
| X = 0 WHEN $V_{ref} < 0$ |
| X' = 1 FROM END OF G" |
| TO END OF G' |
FIG.5D

INTEGRATOR CONTROLLED INVERTER

BACKGROUND OF THE INVENTION

Numerous techniques have been disclosed for controlling the conduction of power switches comprising inverter circuits in order to provide the desired output waveform and voltage levels. The availability of improved semiconductor switching devices, such as, power transistors, gate controlled switches, thyristors, etc. have lead to the development of sophisticated, high frequency inverter power switch control circuits. The efforts to develop circuitry for controlling inverter power switches which provide optimum voltage regulation and output waveform control has resulted in the development of rather complex, expensive control circuitry.

SUMMARY OF THE INVENTION

The invention comprises an inverter power switch conduction control circuit wherein an AC reference waveform is used to alternately render conductive the power switches of one of the two pairs of power switches comprising an inverter circuit, while the integral of the difference between the inverter output waveform and the AC reference waveform is supplied to comparator circuit means which generates output signals for rendering conductive the power switches of the second pair of power switches in response to deviations of the integrated difference beyond predetermined high and low threshold voltage limits. The output of the comparator circuit functions to render conductive the power switch which, coupled with the proper AC reference actuated power switch, will operate to bring the output voltage waveform within high and low threshold voltage limits.

DESCRIPTION OF THE DRAWINGS

The invention will become more readily apparent from the following exemplary description in connection with the accompanying drawing.

FIGS. 2–7 are waveform illustrations of the operation of the embodiment of FIG. 1.

DESCRIPTION OF THE PREFERRED EMBODIMENT

Figure 1:
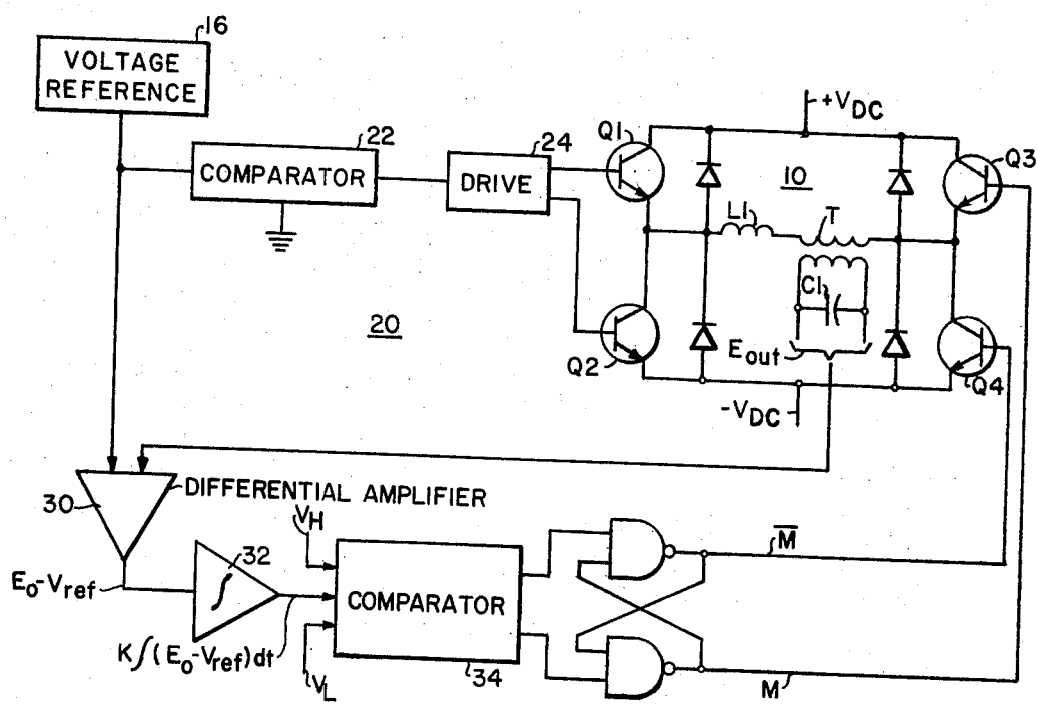
FIG. 1 is a block diagram schematic of an embodiment of integrator controlled inverter.

Referring to FIG. 1 there is illustrated schematically a typical inverter power stage 10 including power switches Q1, Q2, Q3 and Q4 connected in a full bridge configuration, a DC voltage source $V_{DC}$, and a power switch conduction control circuit 20 for generating power switch activating signals. The inverter circuit output voltage $E_{out}$ appearing across the inverter output transformer T is developed by the controlled alternate conduction of the power switch pairs Q1 and Q4, and Q2 and Q3. The resulting pulse width modulated pulse pattern is filtered by the choke L1 and the capacitance C1 to produce an harmonically neutralized output waveform, typically a sine wave. While the power stage illustrated utilizes an output transformer, the invention is equally applicable to an inverter circuit without an output transformer. Furthermore, the representation of the power switches in the inverter circuit 10 as being power transistors is by way of example only. Other power switching devices, such as the SCR and the thyristor, are suitable.

An AC reference source 16 generates an output AC waveform $V_{ref}$, typically a sine wave, having a frequency and an amplitude corresponding to the desired frequency and amplitude of the inverter output waveform $E_{out}$. The AC reference voltage $V_{ref}$ is supplied as inputs to comparator circuit 22 and difference amplifier 30 of the power switch conduction control circuit 20. The comparator circuit 22 functions to generate a squarewave output corresponding in frequency and polarity to the reference voltage $V_{ref}$. The squarewave output of the comparator circuit 22 is supplied as an input signal to drive circuit 24 which responds to the alternate polarity squarewave input signal by producing output signals which alternately render conductive the power switches $Q_1$ and $Q_2$ in synchronization with the alternate half cycles of the reference voltage $V_{ref}$. The gating of power switch Q1 in coincidence with the gating of power switch Q4 results in the generation of an output pulse cross transformer T1 of one polarity, arbitrarily chosen to be positive, while the gating of power switch Q2 in coincidence with power switch Q3 results in the generation of a voltage pulse of the opposite polarity. The duration of the gated condition of power switches Q3 and Q4 during the half cycle in which the associated power switch Q1 and Q2 is gated determines the width of the voltage pulse generated which in turn controls the magnitude of the output voltage $E_{out}$.

Figure 2:
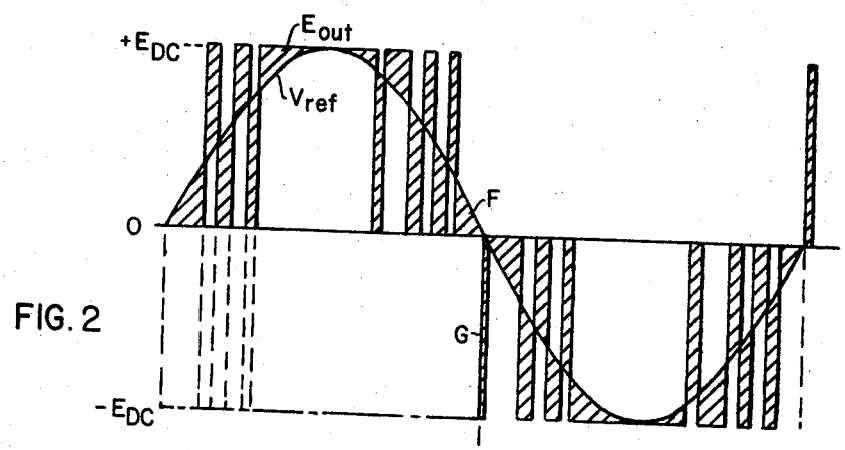
Figure 3:
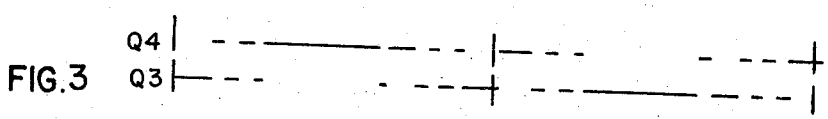
Figure 4:
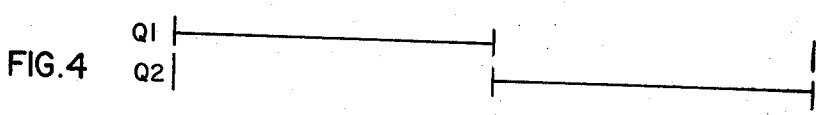

The bridge inverter circuit 10 may be switched such that the output voltage $E_{out}$ is zero, $+V_{DC}$ or $-V_{DC}$. The basic function of this inverter is to fabricate an AC waveform relative to the AC reference $V_{ref}$ by alternately switching between the source voltage $V_{DC}$ and zero such that the volt-seconds of the pulses comprising the output voltages $E_{out}$ equal the volt-seconds of the AC reference voltage $V_{ref}$ as measured from the end of the previous output pulse. This switching technique is illustrated in the waveforms of FIGS. 2, 3 and 4.

The gating pulses for power switches Q3 and Q4 are developed by the operation of difference amplifier 30, integrator 32 and comparator circuit 34.

The difference amplifier 30 functions to subtract the input signals corresponding to the AC reference voltage, $V_{ref}$, from the inverter output voltage $E_{out}$ and generate a signal representing the arithmetic operation $E_{out}-V_{ef}$. The output signal thus developed by the difference amplifier 30 is supplied to integrator 32 which in turn supplies as an input signal to the comparator circuit 34 a signal corresponding to the integral of the difference between $E_{out}$ and $V_{ref}$. Comparator circuit 34 functions to generate an output signal M when the magnitude of a positive polarity integrated input signal exceeds a maximum threshold voltage $V_H$, and to generate an output signal $\overline{M}$ when the magnitude of a negative polarity integrated signal exceeds a threshold voltage $V_L$. The changing of the conductive states of power switches Q3 and Q4 as a result of an input signal equaling the threshold voltage $V_H$ results in change of polarity of the inverter output voltage $E_{out}$ and consequently a change in the polarity of output signal produced by integrator 32. In this instance the integrator 32 generates an output signal to change the conductive condition of the power switches Q3 and Q4 in order to develop opposite polarity output voltage pulses.

The inverter output waveform $E_{out}$ produced by the inverter operation described above is shown in FIG. 2. The cross hatched areas of the output waveform $E_{out}$ (above and below the reference waveform $V_{ref}$) correspond to the integrated output signal of the integrator 32. The operation of the comparator circuit 34 in response to the integrated output signal of integrator 32 functions to establish the switching pattern for power switches Q3 and Q4, as illustrated in FIG. 3, in order to maintain the adjacent cross hatched areas above and below the reference waveform $V_{ref}$ approximately equal thereby achieving approximate equality between the volt-seconds of the output voltage pulses and the volt-seconds of the AC reference voltage. The switching patterns of the power switches Q1 and Q2, which are alternately gated at the frequency of the reference voltage $V_{ref}$, are illustrated in FIG. 4. The combined effect of the integrated pulse rate gated power switches Q3 and Q4 and the reference frequency gated power switches Q1 and Q2 produces the inverter output voltage $E_{out}$ illustrated in FIG. 5.

The control provided by the difference amplifier 30, the integrator 32, and a comparator circuit 34 functions to turn on power switch Q4 each time the output of the integrator 32 reaches the lower threshold voltage limit $V_L$ and to turn on power switch Q3 when the output signal of the integrator 32 reaches the upper threshold voltage limit $V_H$. The polarity of the threshold voltage limits $V_L$ and $V_H$ may both be positive, both negative or of different polarities. Thus, power switches Q3 and Q4 operate independently from power switches Q1 and Q2. This simplified technique for controlling the gating of inverter power switches provides inverter output voltage waveform of a quality sufficient for many applications.

There does exist, however, as evident from the waveform of FIG. 2, a slight variation in the volt-second of the output voltage $E_{out}$ from cycle to cycle. This unbalance is in the form of the shaded area F of FIG. 2 below the reference voltage waveform for which there is no corresponding integrated area above the reference voltage waveform. The magnitude of the volt-second variation in the output waveform depends on the size of this integrated area.

This volt-second unbalance may be eliminated by inverting the first pulse G of the opposite polarity half cycle and making it equal in area to the integrated area F, thereby producing the waveform illustrated in FIGS. 5, 6 and 7.

FIG. 6 shows the output voltage of the integrator 32 which varies between the fixed limits $V_L$ and $V_H$ determined by comparator 34. When either limit is reached a signal is produced to cause the inverter bridge to switch and either start or end a pulse. In FIG. 6 it will be noted that during the positive half cycle the integrator output moves toward the low limit when the output voltage is more positive than the reference sine wave. During the negative half cycle the opposite is true. This requires that the signal fed back to the integrator 32 be reversed at the end of each half cycle. Otherwise the integrator output would continue in the same direction past the limit and thus lose control.

Figure 8:
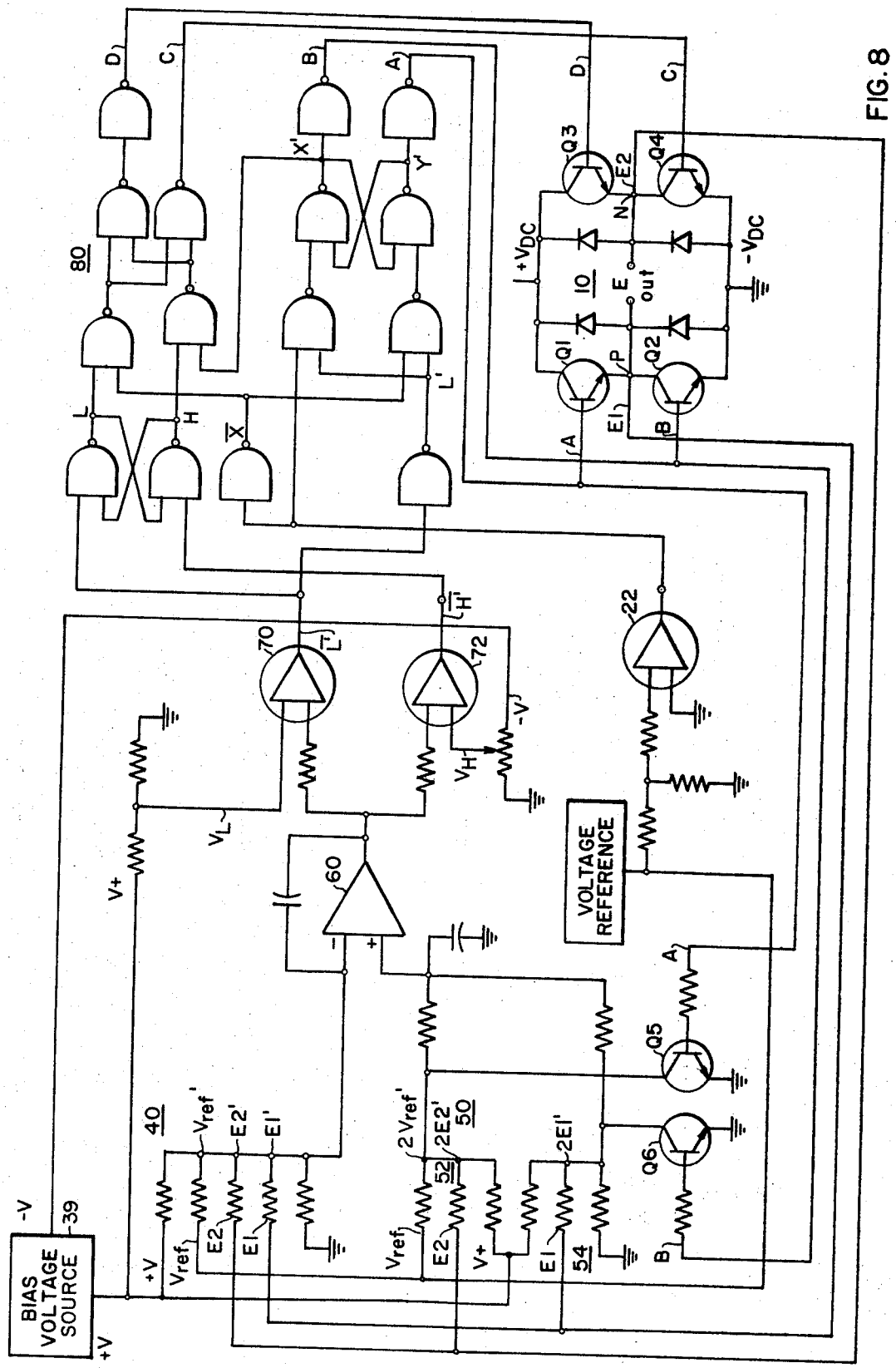
FIG. 8 is an alternate detailed schematic embodiment of the inverter of FIG. 1.

The comparator circuit 34 response to the integrator output signals are illustrated in FIG. 7. A modified schematic embodiment of the inverter power switch control scheme to provide this improvement is illustrated in FIG. 8. The voltages E1 and E2 which are derived from points P and N of the inverter bridge circuit 10, which correspond to the positive and negative segments of the inverter output voltage $E_{out}$, in conjunction with the reference voltage waveform $V_{ref}$ and a positive bias voltage from bias voltage source 39 +V are supplied through summing resistor network 40 to the inverting (−) input terminal of integrator amplifier 60. The same signals are supplied through the summing resistor network 50, which is comprised of resistor networks 52 and 54, to the noninverting (+) terminal of the integrator amplifier 60. The AC reference waveform $V_{ref}$ and the inverter output voltage signal $E_2$ are connected through summing resistor network 52 to the non-inverting input terminal of integrator amplifier 60 while inverter output voltage signal $E_1$ is connected through summing resistor network 54 to the noninverting input terminal of the integrator amplifier 60. Transistors Q5 and Q6 are operatively connected as grounding switches to the outputs of the resistor networks 52 and 54, respectively. Transistor Q5 responds to the gating signal A of the power switch Q1 by grounding the output voltage signal of the resistor network 52, while the transistor Q6 responds to the gating signal B of the power switch Q2 by grounding the output voltage signal of the resistor network 54. The resistor values for the resistors comprising summing resistor networks 40 and 50 are chosen such that the signals applied through the resistor summing network 50 to the noninverting input terminal are twice the magnitude of the signals applied to the inverting input terminal by the summing resistor network 40.

The occurrence of power switch gating signal A renders transistor Q5 conductive thereby shunting the output of resistor network 52 to ground. As a result of this shunting, the signals present at the inputs of the integrator amplifier 60 consist of signal $2E_1'$ from the summing resistor circuit 54 and signals $V_{ref}'$, $E_2'$ and $E_1'$ from the summing resistor circuit 40. This combination of voltage signals forms a combined integrator amplifier input signal of $-2E_1' + (E_1'+E_2'+V_{ref}')$ or $-E_1'+E_2+V_{ref}'$ which may be represented as $-(E'_{out} - V_{ref}')$. When signal B renders power switch Q2 conductive the grounding transistor Q6 is also rendered conductive thereby shunting the output signal $2E_1'$ of the resistor network 54 to ground. This results in the combination of the output signals from summing resistor circuit 52, $-2(V_{ref}'+E_2')$, with the output signals of summing resistors circuit 40 at the inputs to integrator amplifier 60. This combined input to the integrator amplifier 60 is equal to $-2(V_{ref}'+E_2') + (E_1'+E_2'+V_{ref}')$ or $E_1'-E_2'-V_{ref}'$ which may be represented as $+(E_{out}-V_{ref})$. Therefore, depending on whether the A or B power switch gating signal is present, the output signal of the integrator amplifier 60 is either + or −. The output signal of the integrator amplifier 60 is supplied as input signals to comparator circuits 70 and 72 which generate logic output signals when the output signals of the integrator amplifier 60 reach predetermined limits $V_H$ and $V_L$ respectively. Comparator circuit 74 generates logic output signals indicative of the polarity of the AC reference waveform $V_{ref}$. The output signals of the comparator circuits 22, 70 and 72 are manipulated in logic circuit 80 to provide gating signals A, B, C and D for the inverter bridge power switches Q1, Q2, Q3 and Q4. A positive inverter output voltage is possible only when both power switch Q1 and power switch Q4 are rendered conductive; a negative output voltage when power switches Q2 and Q3 are rendered conductive, and a zero output voltage when power switches Q1 and Q3 or, Q2 and Q4 are rendered conductive.

While the logic circuit 80 is implemented with NAND logic, it is noted that equivalent results would result from the use of OR, AND or NOT logic.

Referring to the logic circuit 80 of FIG. 8, the following logic relationships exist:

$H' = 1$, when integrator output exceeds high limit, $V_H$ $L' = 1$, when integrator output diminishes below the low limit $V_L$ $H = 1$, after the high limit $V_H$ is reached and remains 1 until the low limit $V_L$ is reached $L = 1$, after the low limit $V_L$ is reached and remains 1 until the high limit $V_H$ is reached The operation of the logic circuit 80 can best be represented in terms of the Boolean Algebra equations of the signals $A$, $B$, $C$ and $D$.

The Boolean Algebra equation representing signal $A$ is represented as follows:

$A = \overline{Y'}$
$= \overline{\overline{L'} \cdot \overline{X} \cdot X'} = (\overline{L'} + X) \cdot X'$ where $X' = \overline{X \cdot L' \cdot \overline{L' \cdot \overline{X} \cdot X'}}$
$= X \cdot L' + X' \cdot (\overline{L'} + X)$ therefore $A = (\overline{L'} + X) \cdot (X \cdot L' + X' \cdot \overline{L'} + X' \cdot X)$
$= \overline{L'} \cdot X' + X \cdot L' + X' \cdot X$
$= X \cdot L' + X' \cdot (\overline{L'} + X)$
$= X'$ The logic signal $X'$ is initiated at the occurrence of $L'$ during the positive half cycle of the reference waveform $V_{ref}$. $X'$ terminates after the reference waveform $V_{ref}$ goes negative at the first occurrence of $L'$.

The Boolean Algebra equation representing signal $B$ is:

$B = \overline{X'} = \overline{A}$

It is therefore apparent that signals A and B function to render power switches Q1 and Q2 conductive alternately. The Boolean Algebra representation for signal $C$ which operates power switch Q4 is:

$C = \overline{\overline{L \cdot \overline{X} \cdot \overline{H \cdot X'}}}$
$= L \cdot \overline{X} + H \cdot X'$ It is apparent from analysis of the above equation representing signal $C$ that during the positive half cycle of the reference waveform $V_{ref}$ that $C$ equals $H$. Signal $C$ renders power switch Q4 conductive when the integrator output reaches the high limit $V_H$ and maintains power switch Q4 in a conductive state until the low limit $V_L$ is reached. During the final pulse of the positive half cycle both $\overline{X}$ and $X'$ are high and signal $C$ renders power switch Q4 conductive to form the last pulse $G'$.

During the negative half cycle of the reference waveform $V_{ref}$, $\overline{X} = 1$, and $C = L$. Thus, power switch Q4 is rendered conductive when the integrator output reaches the low limit $V_L$ and remains conductive until the high limit $V_H$ is reached. During the negative half cycle of the reference waveform $V_{ref}$, zero output voltage is produced when power switch Q4 is rendered conductive.

The Boolean Algebra equation representing signal $D$ is: $D = \overline{C}$, i.e., when power switch Q4 is rendered conductive, power switch Q3 is rendered nonconductive and vice versa.

Voltage regulation for the integrator controlled inverter is accomplished in accordance with the waveform illustrations of FIGS. 5–7. At point a of the waveform of FIG. 5 the integrator output as illustrated in FIG. 6 is at the low limit $V_L$ where the accumulated error in the output voltage $E_{out}$ is zero. At point b of FIG. 5 the reference waveform $V_{ref}$ has risen while the output voltage $E_{out}$ has remained at zero. The integrator has accumulated the volt-second error in the output voltage $E_{out}$ and as illustrated in FIG. 6 has reached the high limit $V_H$, at which time the output voltage $E_{out}$ assumes a voltage value of $V_{DC}$ which is higher than the reference waveform $V_{ref}$. The error in the output voltage $E_{out}$ is now opposite to that exhibited between points $a$ and $b$. The volt-second error is again accumulated by the integrator until the low limit $V_L$ is again reached resulting in a net accumulated error between points $a$ and $c$ of zero. This means that the average voltage of the reference waveform $V_{ref}$ from points $a$ to $c$ is equal to the average voltage of the output voltage $E_{out}$ from points $a$ to $c$. This process is repeated between points $c$, $d$, $e$, etc., such that by the end of half cycle of the reference waveform $V_{ref}$ the total volt-second in the output voltage $E_{out}$ equals the volt-seconds in the reference waveform $V_{ref}$ for that half cycle. The greater the number of pulses per cycle, the closer the output voltage $E_{out}$ approximates the reference waveform $V_{ref}$. Variation in the applied voltage $V_{DC}$ results in variation in the integration rate which compensates for the magnitude of the supply voltage $V_{DC}$ thereby minimizing the effect on the output voltage $E_{out}$.

The output voltage may be controlled in any manner desired within the design limitations of the circuitry by variations of the reference voltage $V_{ref}$. The inverter circuit may be used as a power amplifier for producing an output voltage in any desired frequency and magnitude within design limits.

I claim:

1. In power inverter apparatus for converting DC voltage from a DC voltage source into AC output voltage, the combination of, a power stage operatively connected to said DC voltage source and including a first and second pair of power switching elements, conduction control circuit means for rendering said pairs of power switches conductive in a manner to produce a pattern of positive and negative voltage pulses relative to a DC reference level, said pattern of pulses corresponding to said AC output voltage, said conduction controlled circuit means including an AC reference circuit means for generating an AC reference signal for alternately rendering conductive the power switches of said first pair of power switches in response to the polarity reversal of said AC reference signal, first circuit means for subtracting said AC reference signal from said AC output voltage and generating an error signal corresponding to said difference, second circuit means for developing the integral of said error signal, and third circuit means for generating a first output signal to render one of the power switches of said second pair of power switches conductive when the value of said integral reaches a first predetermined limit, and generating a second output signal to render the other power switch of said second pair of power switches conductive when the value of said integral reaches a second predetermined limit, the controlled conduction of said first and second pairs of power switches developing an AC output voltage waveform of desired magnitude and frequency.

2. In power inverter apparatus as claimed in claim 1 wherein said AC reference signal is a sinusoidal waveform.

3. In power inverter apparatus as claimed in claim 2 further including fourth circuit means operatively connected between said AC reference circuit means and said first pair of power switches to produce an AC square wave of the same frequency as said AC reference signal, said AC square wave alternately rendering conductive the power switches of said first pair of power switches.

4. In power inverter apparatus as claimed in claim 1 wherein said third circuit means includes a comparator circuit means for comparing the integral of said error signal to a first voltage level corresponding to said first predetermined limit and to a second voltage level corresponding to said second predetermined limit.

5. In power inverter apparatus as claimed in claim 1 including logic circuit means for adjusting the positive and negative voltage pulse patterns within each half cycle of said Ac reference signal to substantially balance the volt-seconds of said AC output voltage and the volt-seconds of said AC reference signal within the respective half cycles.

* * * * *